Sept. 24, 1940.  H. A. BEEKHUIS, JR  2,215,450
PROCESS FOR THE PRODUCTION OF A NITRATE
Filed May 18, 1937  2 Sheets-Sheet 2

Fig. 2

INVENTOR
Herman A. Beekhuis, Jr.,
BY
ATTORNEY

Patented Sept. 24, 1940

2,215,450

UNITED STATES PATENT OFFICE 2,215,450

PROCESS FOR THE PRODUCTION OF A NITRATE

Herman A. Beekhuis, Jr., Petersburg, Va., assignor to The Solvay Process Company, New York, N. Y., a corporation of New York Application May 18, 1937, Serial No. 143,246

11 Claims. (Cl. 23—102)

This invention relates to a process for the production of a nitrate by reaction of nitric acid and a metal chloride, for example an alkali metal chloride such as sodium or potassium chloride or an alkali earth metal chloride such as calcium chloride.

It is known that a metal chloride may be heated with nitric acid to form the corresponding nitrate. If a concentrated acid is used at an elevated temperature, nitrosyl chloride and chlorine are formed in addition to the nitrate.

In forming sodium nitrate, for example, by reaction of sodium chloride and nitric acid, it is especially important to obtain a complete decomposition of the chloride so that when the nitrate solution is evaporated to crystallize the salt it will be obtained with but little sodium chloride in the product. It is known to use a large excess of nitric acid for the decomposition of the sodium chloride. The more excess nitric acid which is employed for treating the chloride, however, the greater is the quantity of mother liquor from the nitrate crystallization step which must be reprocessed, as for example, by adding to it sodium chloride to obtain further decomposition of the nitric acid.

It is pointed out in U. S. Patent 1,036,611 of August 27, 1912, that when sodium chloride is heated with an excess of 36% to 37% nitric acid a considerable proportion of the salt remains undecomposed. With more dilute acids, however, it is said a somewhat greater decomposition of the chloride may be obtained. The process of that patent, therefore, endeavors to increase the proportion of salt which is decomposed by using a dilute nitric acid. It is apparent that in order to recover the nitrate product as the solid salt, it is necessary to evaporate all of the water which enters the process with the nitric acid. Accordingly, the use of dilute acid as proposed in the above U. S. Patent 1,036,611 results in large evaporation costs to recover the nitrate. Further, with the dilute acid being used, instead of the reaction going to form nitrosyl chloride and chlorine, the chlorine is evolved principally in the form of hydrochloric acid.

It is an object of this invention to provide a process for producing a nitrate from nitric acid and a metal chloride by which a reaction mixture of these materials may be treated to substantially completely decompose the chloride and yield a nitrate solution containing but a small percentage of unreacted chloride, and gaseous nitroscyl chloride and chlorine. It is a further object of the invention to provide a process whereby a metal chloride may be substantially completely decomposed by a limited excess of nitric acid so that, if desired, the residual free acid remaining in the resulting nitrate solution may be neutralized and the neutralized solution evaporated to recover the nitrate or, if it is desired to conserve the residual free nitric acid for reprocessing to decompose additional chloride, the amount of acid which must be reprocessed is relatively small.

In carrying out the process of this invention an aqueous reaction mixture of nitric acid and metal chloride is prepared and heated to cause substantially complete reaction of the acid and chloride. In making up the reaction mixture, nitric acid and water are introduced in the proportions of 55 parts or more of $HNO_3$ to every 45 parts of water. This corresponds to the introduction of an aqueous nitric acid containing 55% or more $HNO_3$.

An amount of nitric acid corresponding to about 4.5 $HNO_3$ to 3MeCl to about 8$HNO_3$ to 3MeCl is used. In these expressions the term "$HNO_3$" represents an amount of nitric acid equivalent to one mol weight of $HNO_3$ and the term "MeCl" represents an amount of metal chloride equivalent to one atomic weight of Cl; i. e., 1 mol weight of a chloride of a monovalent metal, ½ mol weight of a chloride of a divalent metal, etc.

The reaction mixture of nitric acid and metal chloride prepared as described in the preceding paragraph is treated to carry out the reaction of the nitric acid and metal chloride in a plurality of stages characterized by different temperatures of the reaction mixture in the successive stages. Thus, the reaction mixture is passed in series, preferably continuously through a plurality of stages in which it is heated at increasing temperatures from a temperature below its boiling point up to its boiling point. Since water and nitric acid are the liquid constituents of the reaction mixture in which the metal chloride and reaction products of the chloride and nitric acid (metal nitrate, nitrosyl chloride and chlorine) are dissolved, the "boiling point" of the reaction mixture is that temperature at which the sum of the partial pressures of $H_2O$ and $HNO_3$ of the reaction mixture is at least substantially equal to the total gas pressure on the reaction mixture. The thus heated reaction mixture is treated at its boiling point with steam and the steam, together with the gases and vapors evolved from the reaction mixture, is passed in contact with the reaction mixture in at least the preceding stage, and preferably all of the other stages, the steam and evolved gases and vapors passing from one stage into contact with reaction mixture in a preceding stage in which it is heated at a lower temperature. Preferably the nitrate solution formed by reaction of the acid and chloride is boiled and the steam generated passed in direct contact with the reaction mixture in the several stages to heat the mixture and to strip from it the nitrosyl chloride and chlorine formed by reaction of the metal chloride and nitric acid. Water vapor accompanying the gases evolved by the reaction is condensed in passing in contact with the reaction mixture at the lower temperatures below its boiling point. The nitrosyl chloride and chlorine gas passing out of contact with the reaction mixture contains an amount of water vapor substantially corresponding to saturation of the gas in contact with the solution with which the gas last contacts. This heating of the reaction mixture and passage of the gases and vapors from one stage in contact with the reaction mixture in a preceding stage, is continued until the metal chloride is substantially completely decomposed (e. g., until the concentration of chloride in the resulting solution of metal nitrate is about 0.5-N or less, and is preferably not above about 0.25-N) and the percentage of free acid (calculated as $HNO_3$) in the resulting nitrate solution is not less than 5 and is also not less than the percentage of water in the solution minus 34 which will hereinafter be written in the mathematical form ($\% H_2O - 34$).

The treatment of the reaction mixture in stages may be accomplished in one or in a plurality of vessels. For example, several vessels may be provided through which the reaction mixture is passed in series and each stage of the reaction carried out in one of the vessels. Or reaction mixture in several stages of treatment may be held in several vessels, with the gases and vapors being conducted from one vessel into contact with reaction mixture at an earlier stage of the treatment in another vessel. In this case different portions of the reaction mixture are subjected to the several stages of treatment in one and the same vessel.

By contacting the gas from the reaction mixture at its boiling point with the reaction mixture at a lower temperature below the boiling point of the reaction mixture, the amount of water vapor left in the thus cooled nitrosyl chloride-chlorine gas is such that the gas then may be subsequently indirectly cooled to a lower temperature to condense out substantially all of the remaining water vapor and this condensate, containing some nitric and hydrochloric acid, may be returned to the reaction mixture without unduly affecting the completeness of the reaction of the chloride and nitric acid. The supplemental cooling of the gases to dry them, however, is preferably accomplished by passing the gases in direct contact with cold acid of a concentration corresponding to 30% or stronger, preferably 40% or stronger, nitric acid. The nitric acid used for cooling the gas, and containing water condensed therefrom, may be introduced into the reaction mixture.

I have discovered that by carrying out the reaction of a metal chloride and nitric acid in accordance with this invention the chloride supplied to the process may be substantially completely decomposed to nitrate; 95% or more of the chloride supplied to the reaction mixture may be converted into nitrate and the resulting nitrate solution may have a chloride content of not over 0.25 normal. This low chloride content in the nitrate solution is of importance in facilitating the use of metallic apparatus for the heating of the solution and permitting the recovery from the solution of commercially pure crystallized nitrate. The substantially complete decomposition of chloride may be accomplished while using a limited excess of nitric acid to chloride.

In its preferred embodiments, this invention comprises preparing a nitric acid containing about 50% or less $HNO_3$ by absorbing nitrogen oxides in water from a gas containing the oxides diluted with other gases. Such gas may be obtained, for example, by oxidizing ammonia with air. The nitric acid thus obtained is concentrated until it contains 55% or more $HNO_3$ and is then introduced into the system where it is reacted with the metal chloride. The concentrating of the acid may be accomplished by boiling it to evaporate water or by reacting nitrogen dioxide with the relatively dilute acid by treating the acid with a concentrated gas containing the same. Both of these procedures may be employed for concentrating the dilute acid. For example, the acid may first be boiled to distill off water and then nitrogen dioxide may be reacted with the thus partially concentrated acid. Also a part of the dilute acid may be concentrated to the desired degree by evaporation of water and another part of the dilute acid may be reacted with concentrated nitrogen dioxide gas.

Among the preferred procedures, one which is particularly advantageous involves the utilization of nitrogen oxide recovered from the evolved nitrosyl chloride to enrich the nitric acid supplied for the reaction. In operating in accordance with this aspect of the invention, nitric acid, water and a metal chloride are continuously supplied to an aqueous reaction mixture of the acid and chloride which is heated as previously described, in a plurality of stages to form a solution of metal nitrate and evolve gaseous nitrosyl chloride and chlorine. The nitrosyl chloride and chlorine are withdrawn from contact with the reaction mixture and the nitrosyl chloride is decomposed with the formation of nitrogen oxide. The nitrogen oxide obtained by decomposition of the nitrosyl chloride is reacted with oxygen and with the water prior to its introduction into the reaction mixture, to increase the proportion of $HNO_3$ to water used in making up the reaction mixture. The proportion of nitric acid to water (exclusive of the nitric acid formed by reaction of a part of the water with the nitrogen oxide recovered by decomposition of the nitrosyl chloride) is about 50 parts or more of $HNO_3$ to every 50 parts of $H_2O$, corresponding to supplying to the process 50% aqueous nitric acid. By reacting with a part of this water the nitrogen oxide and oxygen in amount not substantially less than that equivalent to the nitrosyl chloride evolved from the reaction mixture of nitric acid and metal chloride, the proportion of $HNO_3$ to water supplied is increased to about 55 parts of $HNO_3$ or more for every 45 parts of $H_2O$, corresponding to about 55% or stronger aqueous nitric acid.

The invention will be more particularly described by reference to specific procedures for the production of sodium nitrate which are illustrated in the drawings accompanying this specification.

Figure 1:
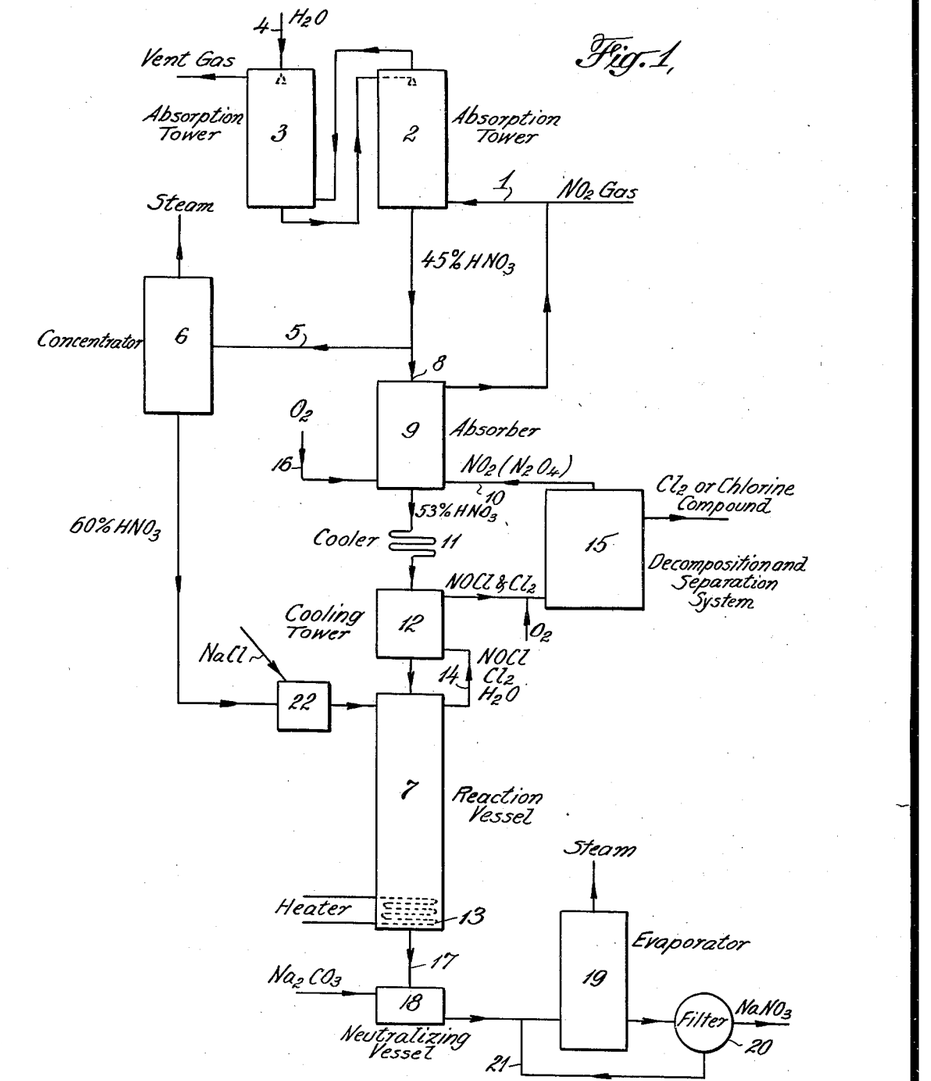
In Fig. 1 of the drawings, there is shown schematically an apparatus assembly suitable for carrying out one process for the reaction of nitric acid and sodium chloride and recovery of the resulting products in accordance with this invention.

With reference to Fig. 1 of the drawings, a gas containing nitrogen dioxide such as may be obtained by the oxidation of ammonia followed by cooling the oxidation products, is passed from a pipe 1 through a series of absorption towers 2 and 3. Water is passed in series through these towers from a pipe 4 in the reverse direction to that in which the nitrogen dioxide gas passes through the series of towers. This water may contain nitric acid; for example, it may contain a nitric acid condensate separated from the ammonia oxidation gases by cooling them prior to their introduction into absorption tower 2. In towers 2 and 3 the water acts to absorb nitrogen oxides from the gas passed therethrough and a nitric acid solution containing, for example, 45% $HNO_3$ is drawn from the bottom of tower 2. This nitric acid is divided into two parts: one part, which may amount to 40% of the acid from the absorption towers, is passed through a pipe 5 into a concentrator 6 where the acid is boiled and the vapors rectified to concentrate the acid until it contains 60% $HNO_3$. This concentrated acid is then mixed with sodium chloride in a vessel 22 in the proportions of 1.15 parts of acid (0.69 part of $HNO_3$) for every one part of dry sodium chloride, and the mixture is continuously introduced into the top of a reaction vessel 7 for reaction of the salt and acid.

Another part of the dilute acid from the absorption towers, constituting about 60% of the acid obtained from these towers, is passed through a pipe 8 into the top of an absorber 9 through which the acid passes downwardly in intimate contact with a concentrated nitrogen dioxide gas which is introduced into the bottom of absorber 9 from a pipe 10. The dilute acid absorbs nitrogen dioxide from the gas and is itself concentrated so that there flows off from the bottom of the absorber 9 a solution of nitric acid containing about 53% $HNO_3$. This acid, in amount corresponding to 2.6 parts of the acid (1.38 parts of $HNO_3$) for every one part of sodium chloride supplied to vessel 7, is passed through a cooler 11 where it is cooled to a temperature of about 0° C. or below, for example to a temperature in the range of −10° C. to 0° C., and then is introduced into the top of a cooling tower 12 through which it passes in intimate contact with the warm gases and vapors coming from reaction vessel 7. After serving to cool the gases and vapors in cooling tower 12, the nitric acid drawn from the bottom of this tower is introduced into reaction vessel 7, where together with the concentrated nitric acid from concentrator 6 it is reacted with sodium chloride to form sodium nitrate and a mixture of nitrosyl chloride and chlorine gases.

In the process of this example, two portions of concentrated nitric acid are supplied to the reaction mixture. One portion is the acid containing 60% $HNO_3$ which is passed from concentrator 6 directly to reaction vessel 7. Another portion containing 53% $HNO_3$ from absorber 9 is first used for the cooling of the gases in cooling tower 12 and the absorption of water vapor leaving the reaction mixture, and is then introduced into vessel 7. Since 1.15 parts of 60% $HNO_3$ and 2.6 parts of 53% $HNO_3$ are supplied to the reaction mixture for every one part of chloride, this is equivalent to supplying 55% nitric acid in amount such that there are 2.07 parts of $HNO_3$ for every one part of NaCl; i. e., 5.75 $HNO_3$ to 3NaCl.

The 60% acid sent directly to mixing vessel 22 and thence to reaction vessel 7 from concentrator 6 and the 45% acid passed into absorber 9 from tower 2, if mixed would give an acid containing 50% $HNO_3$. By enriching the aqueous acid supplied to the reaction vessel by reacting with it the nitrogen dioxide recovered from the nitrosyl chloride evolved by the reaction of the acid and sodium chloride, the concentration of the aqueous acid supplied to the reaction is increased from 50% to 55%.

While it is preferred in carrying out the process of this example to cool and dry the nitrosyl chloride-chlorine gas by direct contact with a portion of the nitric acid which is used in making up the reaction mixture, the process may be operated with the nitrosyl chloride-chlorine gas from the top of reaction vessel 7 being passed through one or more cooling coils in which the gas is indirectly cooled to condense water vapor and dry it. The acidic condensate thus formed may be introduced into vessel 7. In this case the acid from absorber 9 is introduced directly into vessel 7.

Reaction vessel 7 is a tower provided with a plurality of liquid-gas contact plates over which the reaction mixture supplied to the top of the tower passes in series towards the bottom of the tower. Vessel 7 is provided at the bottom with a heater 13 by which the liquor in the bottom of the vessel may be boiled. The steam generated by boiling liquor in the bottom of reaction vessel 7 passes upwardly in vessel 7 in intimate contact with the descending reaction mixture of salt and nitric acid. The steam and gases evolved from the reaction mixture of sodium chloride and nitric acid pass from one plate in contact with the reaction mixture on the next higher plate of the vessel which is at a lower temperature than the lower plate. Thus, in vessel 7 the treatment of the reaction mixture on each plate of the vessel is one of a plurality of stages or reaction zones through which the reaction mixture passes in series. The rate of supply of materials to the top of vessel 7 and their temperature and the amount of boiling of the solution in the bottom of tower 7 are regulated so that a temperature of about 80° C. is maintained in the top of the vessel and the reaction mixture as it descends through vessel 7 in contact with the ascending gases and vapors evolved therein is progressively heated up to boiling and is at its boiling point in the lower portion of vessel 7 where it is treated with steam evolved by heat supplied to the bottom of vessel 7 by heater 13.

Nitrosyl chloride and chlorine formed by reaction of the nitric acid and sodium chloride and water vapor from the boiling liquor, rising through vessel 7, are cooled by the reaction mixture and most of the vaporized water is condensed in the reaction mixture. The gases drawn from the top of vessel 7 contain an amount of water vapor corresponding to saturation at 80° C. in contact with the reaction mixture. These gases are passed through a pipe 14 into the bottom of cooling tower 12. In passing through cooling tower 12 the gases are cooled to approximately —10° C. to 0° C. and their moisture content is further reduced to about that corresponding to saturation of the gases at that temperature in contact with the concentrated nitric acid entering cooling tower 12. By the time the gases and vapors generated from the hot boiling solution in reaction vessel 7 have passed in that vessel in contact with the cooler incoming mixture of nitric acid and salt and with the cooled nitric acid on its way to vessel 7, substantially all of the water vapor evolved from the liquor in the reaction vessel has been condensed and removed from the nitrosyl chloride-chlorine gas.

The cooled and dried gas is passed from cooling tower 12 into a decomposition and separation system 15 in which the nitrosyl chloride is decomposed and a concentrated nitrogen oxide gas is recovered separate from the chlorine, both the chlorine originally in the gases from cooling tower 12 as free chlorine and that combined as nitrosyl chloride. This concentrated nitrogen oxide gas, after treatment if necessary to oxidize lower oxides to nitrogen dioxide or to a higher oxide, is passed through pipe 10 into absorber 9 where it is reacted with a part of the dilute acid from absorption tower 2. Any small amount of unabsorbed nitrogen oxides in the gas leaving absorber 9 may be recovered by introducing this gas into the nitrogen dioxide gas passing through pipe 1. If the nitrogen oxide gas from system 15 contains insufficient oxygen for promoting the absorption and conversion of the nitrogen oxides into nitric acid in absorber 9, a desired proportion of oxygen may be introduced from a pipe 16 into the gas passing through the absorber.

A solution of sodium nitrate is drawn from the bottom of reaction vessel 7 through a pipe 17. This solution has approximately the following composition:

| | |
|---|---|
| $NaNO_3$ | 33.1 |
| $NaCl$ | 0.5 |
| $HNO_3$ | 19.2 |
| $H_2O$ | 47.2 |

Since for this solution $(\%H_2O-34)=13.2$, the 19.2% nitric acid in the solution is not less than 5% and also is not less than 13.2%.

The solution from vessel 7 is introduced into a neutralizing vessel 18. A sufficient amount of a sodium base such as sodium carbonate or caustic soda is introduced into the solution in neutralizing vessel 18 to react with the free nitric acid therein and to form a neutral or slightly basic solution of sodium nitrate. This solution is then passed into evaporator 19 where it is concentrated to crystallize sodium nitrate which is recovered from a filter 20. Mother liquor separated from the crystallized sodium nitrate from filter 20 is returned through a pipe 21 for reconcentration to crystallize additional sodium nitrate in evaporator 19. In operating as described above, substantially all the water introduced into reaction vessel 7 in the nitric acid supplied to this vessel both from concentrator 6 and cooling tower 12, leaves vessel 7 in the nitrate solution drawn from the bottom of the vessel and is evaporated in evaporator 19 in recovering the solid nitrate from the solution.

Decomposition and separation system 15 may be one adopted for the treatment of a mixture of nitrosyl chloride and chlorine gases by any of numerous procedures. For example, this system may comprise means for oxidizing the nitrosyl chloride by oxygen and means for separating the mixture of chlorine and nitrogen dioxide thus obtained. In such a system the nitrosyl chloride and chlorine gas after being mixed with oxygen may be heated and passed in contact with a catalyst promoting the oxidation of the nitrosyl chloride to $NO_2$ and $Cl_2$. After oxidation of the nitrosyl chloride the nitrogen dioxide and chlorine may be separated from each other by liquefaction and fractional distillation of the mixture of liquefied nitrogen dioxide and chlorine to vaporize the chlorine. The pure liquefied nitrogen dioxide may then be passed together with oxygen into absorber 9 or the liquefied nitrogen dioxide may be first vaporized and the gaseous nitrogen dioxide introduced into the absorber.

Instead of catalytically oxidizing the nitrosyl chloride, it may be treated with hot concentrated nitric acid whereby the nitrosyl chloride is oxidized to nitrogen dioxide and chlorine, following which the two gases may be separated by liquefaction and distillation. The separation of the mixture of nitrogen dioxide and chlorine may be carried out by treating the gas with a solvent for one or the other constituent. For example, the gas mixture may be passed in contact with cooled concentrated nitric acid whereby the nitrogen dioxide is absorbed and separated from the chlorine gas. The absorbed nitrogen dioxide may then be recovered from the nitric acid solution by heating the solution. Concentrated sulfuric acid or a mixture of concentrated sulfuric and nitric acids may similarly be employed for dissolving the nitrogen dioxide from admixture with the chlorine, and the nitrogen dioxide recovered by heating the solution.

By any of the foregoing methods the nitrosyl chloride may be decomposed and an amount of nitrogen oxides obtained which is substantially equivalent to, or, when the nitrosyl chloride is oxidized by means of nitric acid, is greater than the nitrogen content of the nitrosyl chloride evolved by the reaction of the nitric acid and chloride. Further, the reaction of the dilute nitric acid with nitrogen dioxide in absorber 9 is carried to the point at which there is a substantially complete recovery in absorber 9 of the combined nitrogen content of the nitrosyl chloride evolved from reaction vessel 7.

Numerous changes and modifications may be made in the particular procedure described above and illustrated in Fig. 1 of the drawings in addition to those already suggested without departing from the scope of this invention. For example, mother liquor from which sodium nitrate has been crystallized and separated in evaporator 19 and filter 20 may be returned and introduced into the reaction mixture in vessel 7. Solid sodium nitrate recovered from filter 20 may also be introduced into the reaction mixture. The addition of preformed sodium nitrate to the reaction mixture in reaction vessel 7 increases the degree of decomposition of the sodium chloride for a given concentration of nitric acid supplied to the reaction mixture and permits of using more dilute nitric acid to obtain the same degree of decomposition of sodium chloride.

In determining the concentration of nitric acid supplied to the reaction mixture in carrying out the process of this invention, three parts by weight of added sodium nitrate are equivalent to one part by weight of HNO₃. For example, nitric acid of a concentration of 50% HNO₃ with 33 parts of sodium nitrate supplied for every 100 parts of HNO₃ and water is equivalent to the use of 55% HNO₃ without supplying sodium nitrate to the reaction mixture in addition to that formed by reaction of the acid and chloride. In practicing this invention, therefore, supplying preformed sodium nitrate to the reaction mixture, the proportions of nitric acid, sodium nitrate and water supplied to the reaction mixture are such that the ratio (by weight)

$$\frac{HNO_3 + 1/3 NaNO_3}{HNO_3 + 1/3 NaNO_3 + H_2O}$$

is not less than 0.55.

Water vapor evolved from the reaction mixture and condensed and returned to the mixture from which it is evolved is not equivalent to the water introduced with the nitric acid supplied to the process and is not considered as water supplied to the reaction mixture in determining the proportions of nitric acid and water employed in carrying out this invention. On the other hand, in introducing into the reaction mixture the mother liquor containing sodium nitrate resulting from the treatment of previous portions of mother liquor, the water introduced with this mother liquor as well as the preformed sodium nitrate contained therein, is taken into account in determining the proportions of nitric acid and water supplied to the reaction mixture.

When mother liquor from the nitrate crystallization is returned to the reaction mixture of acid and salt, the neutralization of the free acid in the liquor leaving reaction vessel 7 may be omitted, in which case this acid may be returned in the mother liquor for reaction with salt in vessel 7.

In the above example about 2.07 parts of HNO₃ for every 1 part of NaCl are supplied to the reaction mixture. This ratio may be varied within the range of 1½ to 3 parts of HNO₃ for every 1 part of NaCl.

Figure 2:
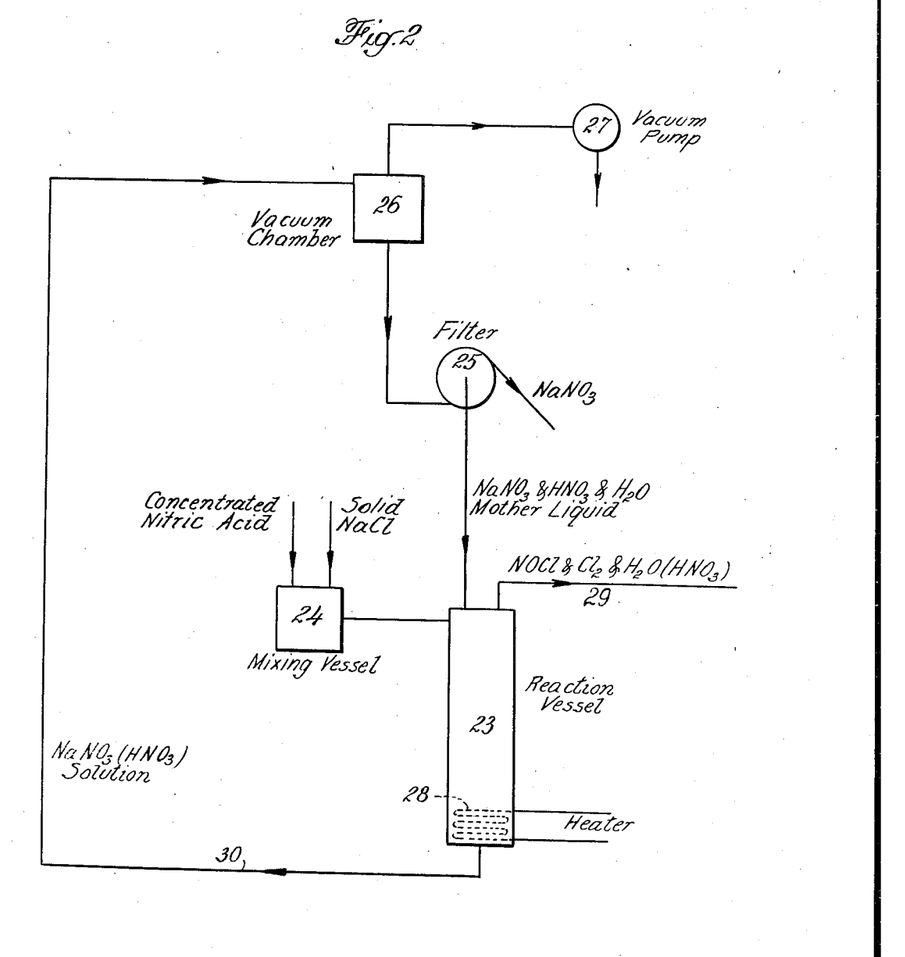
In Fig. 2, there is shown an apparatus for carrying out a modification of the procedure illustrated in Fig. 1 for reacting the nitric acid and sodium chloride and for recovering solid sodium nitrate from the solution obtained in carrying out this reaction.

Referring to Fig. 2 of the drawings, this illustrates a modification of the process described above and illustrated in Fig. 1, for reacting nitric acid and sodium chloride and recovering solid sodium nitrate from the resulting solution. In Fig. 2 reaction vessel 23 corresponds to reaction vessel 7 of Fig. 1. The apparatus of Fig. 2 also comprises a mixing vessel 24, filter 25, vacuum evaporator 26 and vacuum pump 27.

In making sodium nitrate by the process illustrated in this figure, a concentrated nitric acid is mixed with substantially dry sodium chloride in mixer 24. For example, about 407 parts of 71% nitric acid and about 175 parts of sodium chloride may be mixed in vessel 24 and passed into reaction vessel 23. There is also introduced into reaction vessel 23 about 380 parts of mother liquor from filter 25.

In the reaction vessel 23, which contains liquid gas contact plates, as in the case of the reaction vessel in Fig. 1, the reaction mixture introduced to the top of the vessel passes downwardly through the vessel and is progressively heated in the several stages or reaction zones in the vessel from a temperature of about 100°–110° C. at the top of reaction vessel 23 up to its boiling point. The sodium nitrate solution produced by reaction of the nitric acid and salt is boiled in the bottom of the vessel by means of heat supplied by heater 28. The steam evolved from the boiling sodium nitrate solution passes upwardly through vessel 23 in direct contact with the reaction mixture in this vessel and serves to heat the reaction mixture and strip from it nitrosyl chloride and chlorine. Gases evolved by the reaction accompanied by water vapor vaporized from the acid solution in the bottom of the vessel, rise upwardly through the vessel in direct contact with the reaction mixture at its boiling point, then in contact with reaction mixture at a lower temperature and leave the top of the vessel through a pipe 29. The gases leaving vessel 23 are in large part nitrosyl chloride and chlorine and are substantially saturated with water vapor in contact with the incoming reaction mixture of sodium chloride and nitric acid at a temperature below the boiling point of the reaction mixture in the top of the vessel.

The sodium nitrate solution in the bottom of vessel 23 is withdrawn through a pipe 30. This solution has the following composition:

|  | Per cent |
|---|---|
| NaNO₃ | 49.0 |
| NaCl | 0.1 |
| HNO₃ | 16.9 |
| H₂O | 34.0 |

In this case (%H₂O—34) = –0, and the nitric acid content of the solution, 16.9%, is not less than 5 and also is not less than 0.

The solution from vessel 23 is passed into a vacuum chamber 26 where it is subjected to a lower pressure than the pressure in vessel 23. This lower pressure is maintained in vacuum chamber 26 by means of vacuum pump 27. At the lower pressure water vapor is evaporated from the hot sodium nitrate solution by means of the self-contained heat of the solution. The evaporation of water in chamber 26 also serves to cool the solution. By the evaporation and cooling of the solution in vacuum chamber 26, solid sodium nitrate is crystallized from the solution and is recovered from the mother liquor in filter 25. The mother liquor from which the solid sodium nitrate has been separated is then returned to reaction vessel 23 as described above. This returned mother liquor may, for example, have the following composition:

|  | Parts |
|---|---|
| NaNO₃ | 91 |
| HNO₃ | 114 |
| H₂O | 175 |

In the process of Example 2 as described above, there is supplied to the reaction mixture in vessel 23 a total of about 405 parts of nitric acid, 291 parts of water, and 91 parts of sodium nitrate in the concentrated nitric acid introduced into mixer 24 and the mother liquor returned to vessel 23 from filter 25. The water and HNO₃ content of the materials supplied to reaction vessel 23 corresponds, on an NaNO₃ free basis, to supplying an aqueous nitric acid containing about 58% HNO₃. The ratio $$\frac{HNO_3 + 1/3 NaNO_3}{HNO_3 + H_2O + 1/3 NaNO_3}$$

is equal to 0.6.

In the process of Fig. 2 water is supplied in the concentrated nitric acid introduced into mixing vessel 24 and additional water is formed by the reaction of the nitric acid and sodium chloride. Water is withdrawn from the process in the vapors leaving the top of reaction vessel 23 and as water vapor drawn from vacuum chamber 26.

There is also a small amount of water left in the solid sodium nitrate withdrawn from filter 25. In operating in accordance with the procedure described substantially all of the water introduced into the reaction mixture plus water formed as a result of the reaction is withdrawn in the gases and vapors from reaction vessel 23 and as water vapor evaporated from the nitrate solution in vacuum chamber 26 by the self-contained heat of the solution. The major proportion of the water will be withdrawn in the gases and vapors leaving reaction vessel 23 and by thus operating substantially complete decomposition of the chloride in the reaction mixture is facilitated.

It will be understood that in operating the process described above in conjunction with Fig. 2, the nitric acid supplied to mixing vessel 24 may be prepared in the same manner as the acid which is supplied to mixing vessel 22 of Fig. 1 is prepared. Further, the nitrosyl chloride in the gas leaving reaction vessel 23 may be oxidized and the nitrogen oxides thus recovered employed for enriching 50% or stronger nitric acid to be used for decomposition of the sodium chloride.

This application is a continuation-in-part of my copending application Serial No. 684,829, filed August 12, 1933, now United States Patent No. 2,148,429, patented February 28, 1939.

I claim:

1. The process for the production of a nitrate which comprises preparing an aqueous reaction mixture from nitric acid, water and metal chloride in the proportions of substantially 4.5 mols $HNO_3$ to 3MeCl (MeCl=metal chloride equivalent to one atomic weight of Cl) to $8HNO_3$ to 3MeCl, and 55 parts or more nitric acid to every 45 parts of water, heating reaction mixture thus prepared in a plurality of stages in which the reaction mixture is heated at increasing temperatures from one stage to the next up to its boiling point without maintaining the reaction mixture under a sub-atmospheric pressure, contacting the thus heated reaction mixture at its boiling point with steam, passing the steam together with gases and vapors resulting from the reaction of said nitric acid and metal chloride and evolved from the reaction mixture at its boiling point in direct contact with reaction mixture in a preceding stage in which the reaction mixture is at a temperature below its boiling point to cool the gases and vapors and condense therefrom water vapor, and withdrawing the gases and vapors from contact with the reaction mixture at a temperature below its boiling point.

2. The process for the production of a nitrate which comprises preparing an aqueous reaction mixture from nitric acid, water and metal chloride in the proportions of substantially 4.5 mols $HNO_3$ to 3MeCl (MeCl=metal chloride equivalent to one atomic weight of Cl) to $8HNO_3$ to 3MeCl, and 55 parts or more nitric acid to every 45 parts of water, heating reaction mixture thus prepared in a plurality of stages in which the reaction mixture is heated at increasing temperatures from one stage to the next up to its boiling point without maintaining the reaction mixture under a sub-atmospheric pressure, contacting the thus heated reaction mixture at its boiling point with steam, passing the steam together with gases and vapors resulting from the reaction of said nitric acid and metal chloride and evolved from the reaction mixture at its boiling point in direct contact with reaction mixture in a preceding stage in which the reaction mixture is at a temperature below its boiling point to cool the gases and vapors and condense therefrom water vapor, withdrawing the gases and vapors from contact with the reaction mixture at a temperature below its boiling point and continuing the aforesaid heating of the reaction mixture and treatment with steam until the percentage of free acid (calculated as $HNO_3$) in the resulting nitrate solution is not less than 5 and is also not less than (%$H_2O$—34).

3. The process for the production of a nitrate which comprises preparing an aqueous reaction mixture from nitric acid, water and metal chloride in the proportions of substantially 4.5 mols $HNO_3$ to 3MeCl (MeCl=metal chloride equivalent to one atomic weight of Cl) to $8HNO_3$ to 3MeCl, and 55 parts or more nitric acid to every 45 parts of water, heating reaction mixture thus prepared in a plurality of stages in which the reaction mixture is heated at increasing temperatures from one stage to the next up to its boiling point without maintaining the reaction mixture under a sub-atmospheric pressure, boiling the resulting nitrate solution, passing steam evolved by boiling the nitrate solution in direct contact with the reaction mixture at its boiling point and then, accompanied by the gases and vapors evolved from the reaction mixture at its boiling point, in direct contact with reaction mixture in a preceding stage in which the reaction mixture is at a temperature below its boiling point to cool the gases and vapors and condense therefrom water vapor, and continuing the aforesaid heating and treatment of the reaction mixture with steam until the percentage of free acid (calculated as $HNO_3$) in the resulting nitrate solution is not less than 5 and is also not less than (%$H_2O$—34), whereby said metal chloride is substantially completely decomposed and the concentration of chloride in the resulting nitrate solution is not substantially above 0.5—N.

4. The process for the production of sodium nitrate which comprises preparing an aqueous reaction mixture from nitric acid, water and sodium chloride in the proportions of substantially 4.5 mols $HNO_3$ to 3NaCl to $8HNO_3$ to 3NaCl, and in proportions such that the ratio of $$\frac{HNO_3 + 1/3 NaNO_3}{HNO_3 + 1/3 NaNO_3 + H_2O}$$

is not less than 0.55, where $HNO_3$, $NaNO_3$ and $H_2O$ represent the weights of nitric acid, preformed sodium nitrate (which may be equal to zero) and water, respectively, heating reaction mixture thus prepared in a plurality of stages in which the reaction mixture is heated at increasing temperatures from one stage to the next up to its boiling point without maintaining the reaction mixture under a sub-atmospheric pressure, contacting the thus heated reaction mixture at its boiling point with steam, passing the steam together with gases and vapors resulting from the reaction of said nitric acid and sodium chloride and evolved from the reaction mixture at its boiling point in direct contact with reaction mixture in a preceding stage in which the reaction mixture is at a temperature below its boiling point to cool the gases and vapors and condense therefrom water vapor, and withdrawing the gases and vapors from contact with the reaction mixture at a temperature below its boiling point.

5. The process for the production of sodium nitrate which comprises preparing an aqueous reaction mixture from nitric acid, water and sodium chloride in the proportions of substantially 4.5 mols HNO₃ to 3NaCl to 8HNO₃ to 3NaCl, and in proportions such that the ratio of $$\frac{HNO_3 + 1/3 NaNO_3}{HNO_3 + 1/3 NaNO_3 + H_2O}$$

is not less than 0.55, where HNO₃, NaNO₃ and H₂O represent the weights of nitric acid, preformed sodium nitrate (which may be equal to zero) and water, respectively, heating reaction mixture thus prepared in a plurality of stages in which the reaction mixture is heated at increasing temperatures from one stage to the next up to its boiling point without maintaining the reaction mixture under a sub-atmospheric pressure, contacting the thus heated reaction mixture at its boiling point with steam, passing the steam together with gases and vapors resulting from the reaction of said nitric acid and sodium chloride and evolved from the reaction mixture at its boiling point in direct contact with reaction mixture in a preceding stage in which the reaction mixture is at a temperature below its boiling point to cool the gases and vapors and condense therefrom water vapor, withdrawing the gases and vapors from contact with the reaction mixture at a temperature below its boiling point and continuing the aforesaid heating of the reaction mixture and treatment with steam until the percentage of free acid (calculated as HNO₃) in the resulting nitrate solution is not less than 5 and is also not less than (%H₂O−34).

6. The process for the production of a nitrate which comprises preparing an aqueous mixture from nitric acid, water and sodium chloride in the proportions of substantially 4.5 mols HNO₃ to 3NaCl to 8HNO₃ to 3NaCl, and in proportions such that the ratio of $$\frac{HNO_3 + 1/3 NaNO_3}{HNO_3 + 1/3 NaNO_3 + H_2O}$$

is not less than 0.55, where HNO₃ NaNO₃ and H₂O represent the weights of nitric acid, preformed sodium nitrate (which may be equal to zero) and water, respectively, heating reaction mixture thus prepared in a plurality of stages in which the reaction mixture is heated at increasing temperatures from one stage to the next up to its boiling point without maintaining the reaction mixture under a sub-atmospheric pressure, boiling the resultant nitrate solution, passing steam evolved by boiling the nitrate solution in direct contact with the reaction mixture at its boiling point and then, accompanied by the gases and vapors evolved from the reaction mixture at its boiling point, in direct contact with reaction mixture in a preceding stage in which the reaction mixture is at a temperature below its boiling point to cool the gases and vapors and condense therefrom water vapor, and continuing the aforesaid heating and treatment of the reaction mixture with steam until the percentage of free acid (calculated as HNO₃) in the resulting nitrate solution is not less than 5 and is also not less than (%H₂O−34), whereby said sodium chloride is substantially completely decomposed and the concentration of chloride in the resulting nitrate solution is not substantially above 0.5−N.

7. The process for the production of a nitrate which comprises continuously supplying water, nitric acid and a metal chloride to an aqueous reaction mixture of nitric acid and metal chloride, heating said reaction mixture in a plurality of reaction stages in which the reaction mixture is heated at increasing temperatures from one stage to the next up to the boiling point of the reaction mixture without maintaining said reaction mixture under a sub-atmospheric pressure to decompose the metal chloride forming metal nitrate and evolve nitrosyl chloride and chlorine, treating the reaction mixture at its boiling point with steam until the concentration of chloride in the resulting nitrate solution is not substantially above 0.5−N, passing gases and vapors resulting from the reaction of said nitric acid and metal chloride and evolved from the reaction mixture at its boiling point in direct contact with reaction mixture in a preceding stage in which the reaction mixture is at a temperature below its boiling point to cool the gases and vapors and condense therefrom water vapor, withdrawing the gases and vapors from contact with the reaction mixture at a temperature below its boiling point, decomposing the nitrosyl chloride contained in said gases and vapors, reacting nitrogen oxide thus obtained with oxygen and with the aforesaid water prior to its introduction into said reaction mixture to form therewith additional nitric acid in amount not substantially less than that equivalent to the nitrosyl chloride evolved from said reaction mixture, and supplying to said reaction mixture said water, nitric acid and metal chloride in the proportions of 50 parts or more nitric acid (exclusive of the nitric acid formed by reaction of said nitrogen oxide, oxygen and water) to every 50 parts of water, and substantially 4.5 mols HNO₃ (inclusive of the nitric acid formed by reaction of said nitrogen oxide, oxygen and water) to 3MeCl (MeCl=metal chloride equivalent to one atomic weight of Cl) to 8HNO₃ to 3MeCl.

8. The process for the production of sodium nitrate which comprises continuously supplying water, nitric acid and sodium chloride to an aqueous reaction mixture of nitric acid and sodium chloride, heating said reaction mixture in a plurality of reaction stages in which the reaction mixture is heated at increasing temperatures from one stage to the next up to the boiling point of the reaction mixture without maintaining said reaction mixture under a sub-atmospheric pressure to decompose the sodium chloride forming sodium nitrate and evolve nitrosyl chloride and chlorine, treating the reaction mixture at its boiling point with steam until the concentration of chloride in the resulting nitrate solution is not substantially above 0.5−N, passing gases and vapors resulting from the reaction of said nitric acid and sodium chloride and evolved from the reaction mixture at its boiling point in direct contact with reaction mixture in a preceding stage in which the reaction mixture is at a temperature below its boiling point, withdrawing the gases and vapors from contact with the reaction mixture at a temperature below its boiling point to cool the gases and vapors and condense therefrom water vapor, decomposing the nitrosyl chloride contained in said gases and vapors, reacting nitrogen oxide thus obtained with oxygen and with the aforesaid water prior to its introduction into said reaction mixture to form therewith additional nitric acid in amount not substantially less than that equivalent to the nitrosyl chloride evolved from said reaction mixture, and supplying to said reaction mixture said water, nitric acid and sodium chloride in proportions such that the ratio of $$\frac{HNO_3 + 1/3 NaNO_3}{HNO_3 + 1/3 NaNO_3 + H_2O}$$

is not less than 0.5, where HNO₃, NaNO₃ and $H_2O$ represent the weights of nitric acid (exclusive of the nitric acid formed by reaction of said nitrogen oxide, oxygen and water), preformed sodium nitrate (which may be equal to zero) and water, respectively, and such that the ratio of nitric acid to sodium chloride is substantially 4.5 mols $HNO_3$ (inclusive of the nitric acid formed by reaction of said nitrogen oxide, oxygen and water) to 3NaCl to 8HNO$_3$ to 3MeCl.

9. The process for the production of a nitrate which comprises continuously passing a reaction mixture prepared from a metal chloride and nitric acid and water in proportions corresponding to 55% or stronger nitric acid into a reaction zone in which the reaction mixture is heated to cause reaction of nitric acid and metal chloride to form a metal nitrate with the evolution of gaseous nitrosyl chloride and chlorine and passing the gases and vapors evolved in said reaction in direct contact with said reaction mixture prior to its entry into said reaction zone and while it is at a temperature below its boiling point to cool the gases and vapors and condense therefrom water vapor.

10. The process for the production of a nitrate which comprises preparing a reaction mixture from metal chloride and nitric acid and water in proportions corresponding to 55 parts or more of $HNO_3$ for every 45 parts of water, heating the thus prepared reaction mixture from a temperature below its boiling point up to the boiling point of the reaction mixture without maintaining said reaction mixture under a sub-atmospheric pressure, and passing the gases and vapors resulting from the reaction of the nitric acid and metal chloride together with steam in continuous countercurrent flow and in direct contact with said reaction mixture at a temperature below its boiling point to cool the gases and vapors and condense therefrom water vapor.

11. The process for the production of a nitrate which comprises preparing a reaction mixture from metal chloride and nitric acid and water in proportions corresponding to 55 parts or more of $HNO_3$ for every 45 parts of water, heating reaction mixture thus prepared to a temperature at which the metal chloride is substantially completely decomposed to metal nitrate and gaseous nitrosyl chloride and chlorine, passing the gases and vapors resulting from the heating of the reaction mixture in direct contact with reaction mixture containing said nitric acid, water and a metal chloride at a temperature lower than that of the reaction mixture from which the gases were evolved and below the boiling point of the reaction mixture with which the gases and vapors are contacted to cool the gases and vapors and condense therefrom water vapor, then withdrawing the gases and vapors from contact with the reaction mixture and heating the last mentioned reaction mixture to cause reaction of the acid and chloride therein.

HERMAN A. BEEKHUIS, Jr.

CERTIFICATE OF CORRECTION.

Patent No. 2,215,450.  September 24, 1940.

HERMAN A. BEEKHUIS, JR.

It is hereby certified that error appears in the printed specification of the above numbered patent requiring correction as follows: Page 1, first column, line 53, for "nitroscyl" read --nitrosyl--; page 7, first column, line 40, claim 6, after "$HNO_3$" insert a comma; and second column, lines 60 and 61, claim 8, strike out the words "to cool the gases and vapors and condense therefrom water vapor" and insert the same after "point" and before the comma in line 57, same claim; and that the said Letters Patent should be read with this correction therein that the same may conform to the record of the case in the Patent Office.

Signed and sealed this 29th day of October, A. D. 1940.

Henry Van Arsdale,
Acting Commissioner of Patents.

(Seal)